United States Patent Office

Re. 27,894
Reissued Jan. 22, 1974

27,894

4-HYDROXY-3-(3-PHENYLUREIDO)CROTONIC ACID, GAMMA LACTONE COMPOUNDS

Peter Gerike, Hilden, Germany, assignor to E. I. du Pont de Nemours and Company, Wilmington, Del.

No Drawing. Original No. 3,541,111, dated Nov. 17, 1970, Ser. No. 727,712, May 8, 1968. Application for reissue May 15, 1972, Ser. No. 253,639
**Int. Cl. C07d *5/06***
U.S. Cl. 260—343.6 8 Claims

Matter enclosed in heavy brackets [ ] appears in the original patent but forms no part of this reissue specification; matter printed in italics indicates the additions made by reissue.

ABSTRACT OF THE DISCLOSURE

Novel compounds are presented which have the following structure

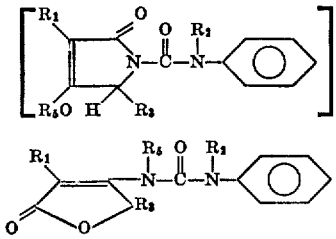

where:

$R_1$ is hydrogen, halogen, methyl or ethyl, $R_2$ and $R_3$ are independently selected from hydrogen or alkyl of one through three carbon atoms and salts of said compounds when $R_5$ is hydrogen where the salt forming constituent is an alkali metal ion, alkaline earth metal ion, ammonium ion or mono-, di-, tri-, or tetra-substituted ammonium ion where the substituents are alkyl of one through four carbon atoms or benzyl, and $R_5$ is hydrogen or alkyl of one through four carbon atoms.

These compounds are excellent defoliants.

This invention relates to novel *4-hydroxy-3-(-3-phenylureido)crotonic acid, gamma lactone compounds* [4-hydroxy-2-oxo-3-pyrroline-1-carboxanilides] and their use as defoilants and plant growth retardants.

More particularly, this invention is directed to compositions and methods employing, as an active ingredient, at least one compound of the formula

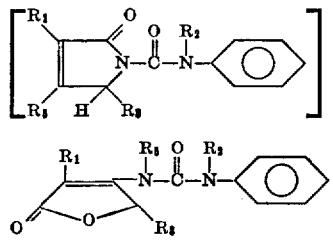

where:

$R_1$ is hydrogen, halogen, methyl or ethyl;

$R_2$ and $R_3$ are each independently selected from hydrogen or alkyl of one through three carbon atoms;

$R_5$ is hydrogen or alkyl of one through four carbon atoms; and salts of said compounds when $R_5$ is hydrogen with an alkali metal ion, alkaline earth metal ion, ammonium ion or $H_y(R_4)_{4-y}N^+$ where $R_4$ is an alkyl radical of one through four carbon atoms or benzyl and $y$ is 0 to three.

[When $R_5$ is hydrogen the compounds (I) may exist in two tantomeric forms (i.e. the 4 position may be keto). Since the enol form seems to be preferred, the structures have been exclusively named as such.]

Especially preferred for use because of their outstanding defoliating effectiveness and retardation of plant growth are:

[4-hydroxy-2-oxo-3-pyrroline-1-carboxanilide, sodium salt
4-hydroxy-2-oxo-3-pyrroline-1-carboxanilide, lithium salt
3-chloro-4-hydroxy-2-oxo-3-pyrroline-1-carboxanilide
3-bromo-4-hydroxy-2-oxo-3-pyrroline-1-carboxanilide
3-chloro-4-hydroxy-2-oxo-3-pyrroline-1-carboxanilide, sodium and potassium salts
3-bromo-4-hydroxy-2-oxo-3-pyrroline-1-carboxanilide, sodium and potassium salts]
*4-hydroxy-3-(3-phenylureido)crotonic acid, gamma lactone, sodium salt*
*4-hydroxy-3-(3-phenylureido)crotonic acid, gamma lactone, lithium salt*
*2-chloro-4-hydroxy-3-(3-phenylureido)crotonic acid, gamma lactone*
*2-bromo-4-hydroxy-3-(3-phenylureido)crotonic acid, gamma lactone*
*2-chloro-4-hydroxy-3-(3-phenylureido)crotonic acid, gamma lactone, sodium and potassium salts*
*2-bromo-4-hydroxy-3-(3-phenylureido)crotonic acid, gamma lactone, sodium and potassium salts*
[4-hydroxy-3-methyl-2-oxo-3-pyrroline-1-carboxanilide
4-hydroxy-3-ethyl-2-oxo-3-pyrroline-1-carboxanilide
4-hydroxy-2-oxo-3-pyrroline-1-(N-methylcarboxanilide) lithium, sodium and potassium salts
3-chloro-4-hydroxy-2-oxo-3-pyrroline-1-(N-methylcarboxanilide), and its lithium, sodium and potassium salts
3-bromo-4-hydroxy-2-oxo-3-pyrroline-1-(N-methylcarboxanilide), and its lithium, sodium, and potassium salts]
*2-methyl-4-hydroxy-3-(3-phenylureido)crotonic acid, gamma lactone*
*2-ethyl-4-hydroxy-3-(3-phenylureido)crotonic acid, gamma lactone*
*4-hydroxy-3-(3-methyl-3-phenylureido)crotonic acid, gamma lactone, lithium, sodium and potassium salts*
*2-chloro-4-hydroxy-3-(3-methyl-3-phenylureido)crotonic acid, gamma lactone, and its lithium, sodium, and potassium salts*
*2-bromo-4-hydroxy-3-(3-methyl-3-phenylureido)crotonic acid, gamma lactone, and its lithium, sodium, and potassium salts*

The salts are preferred because of their water solubility resulting in greater handling ease.

PREPARATION OF THE COMPOUNDS

Those [4-hydroxy-2-oxo-3-pyrroline-1-carboxanilides] *4-hydroxy-3-(3-phenylureido)crotonic acid, gamma lactone compounds* where $R_1$ is hydrogen, methyl or ethyl, are made according to the following equation:

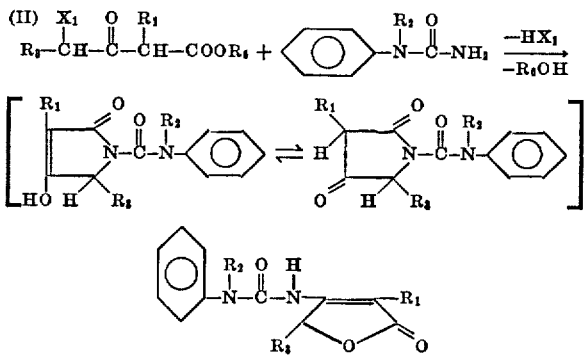

where:

$R_1$, $R_2$ and $R_3$ have the same meaning as in structure (I) with the exceptions made and $X_1$ designates chlorine or bromine.

$R_6$ [$R_5$] is lower alkyl such as methyl, ethyl, benzyl.

The [enol] reaction product of reaction (II) may be alkylated with Meerwein reagent according to the equation:

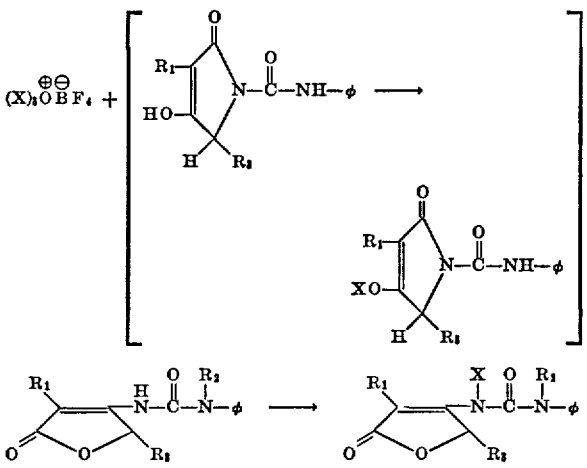

(when $X=C_1$–$C_4$)

The reagent and its reactions are described by H. Meerwein et al., J. Prakt. Chem., 147, 257 (1937).

The appropriately substituted ethyl acetoacetate and the unsubstituted phenylurea or 1-alkyl-1-phenylurea are dissolved or suspended in a suitable organic solvent such as xylene, toluene, benzene, dibutylether, tetrahydrofuran, or dioxane. The solution or suspension is stirred and refluxed for several hours. The mixture is cooled. In some cases, (1) the product may be filtered and washed with a suitable solvent such as ethanol, methanol or ether to yield essentially pure product, which, however, may be recrystallized from a solvent such as methanol, ethanol, or a dimethylformamide-water mixture;

(2) or, the solvent may be stripped off in vacuo and the residue dissolved in a water immiscible solvent such as chloroform, methylene chloride, or diethyl ether. This solution is then extracted with aqueous base, the resulting solution separated from the organic layer and acidified with a mineral acid. The precipitate is collected on a filter and treated as before;

(3) or, after stripping off the solvent, the residue may be directly recrystallized from a suitable solvent, such as an alcohol, a ketone, a dimethylformamide-water mixture, etc.

The reactants, substituted ethyl acetoacetate and phenylurea, are easily obtained according to the equation:

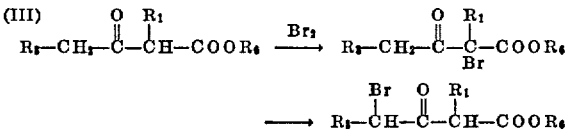

The bromine rearranges easily on standing from the 2- into the 4-position. This reaction is amply described in the literature, see, e.g. M. S. Kharasch, E. Hernfeld, F. R. Mayo, J. Am. Chem. Soc 59, 1655 (1937) or A. Burger, G. E. Ullyot, J. Org. Chem. 12, 342 (1947).

The preparation of ethyl α-chloroacetoacetate according to

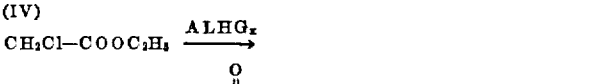

is described by M. Picha, Monath. Chem. 27, 1247 (1906) and, according to

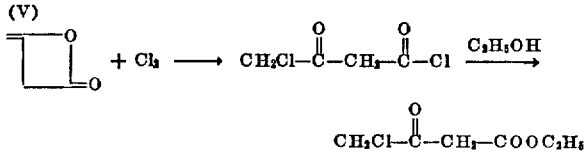

by C. D. Hurd, J. L. Abernethy, J. Am. Chem. Soc. 62, 1147 (1940).

Compounds of structure (I) where $R_1$ is fluorine, are prepared, starting with ethyl α-fluoroacetoacetate, in the usual fashion. Ethyl α-fluoroacetoacetate may be synthesized as follows:

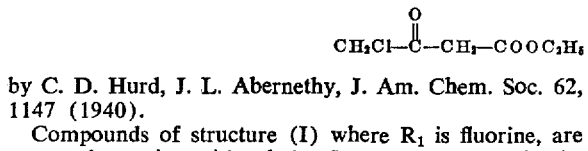

as described by E. D. Bergmann, S. Cohen, I. Shahak, J. Chem. Soc., 1959, 3278.

The ethyl α-fluoroacetoacetate is brominated to ethyl 4-bromo-2-fluoroacetoacetate and reacted with a urea as described under (III) and (II).

1-alkyl-1-phenylureas may be prepared from N-alkyl substituted anilines in the following fashion:

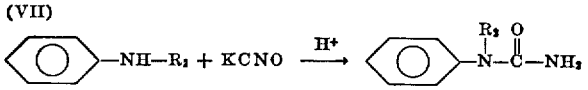

For more details, see, e.g. W. Gebhardt, Ber. 17, 2095 (1884).

When $R_1$ is hydrogen, the substituted [4-hydroxy-2-oxo-3 - pyrroline - 1 - carboxanilide,] *4-hydroxy-3-(3-phenylureido)crotonic acid, gamma lactone* obtained as described under (II), may be halogenated:

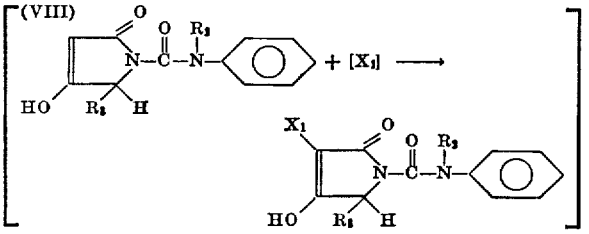

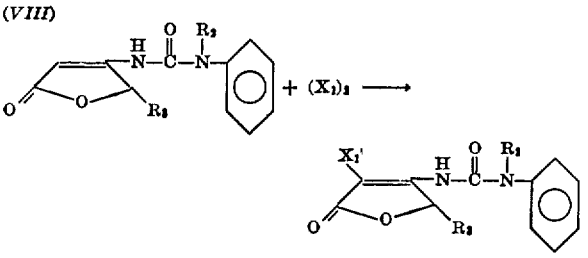

The compound is dissolved or suspended in glacial acetic acid. An equimolar amount of sulfuryl chloride ($X_1$=Cl) or bromine ($X_1$=Br) is added dropwise at room temperature with stirring. The product is either filtered or, if a solution is obtained, the product is precipitated by addition of water, collected on a filter, and washed thoroughly with water. The compounds thusly obtained are essentially pure but may be recrystallized from a suitable solvent.

When $X_1$ is iodine, the starting material is dissolved or dispersed in glacial acetic acid, a half-equimolar amount of iodine added and subsequently an equimolar amount of fuming nitric acid.

The [3-pyrroline - 1 - carboxanilides] *4-hydroxy-3-(3-phenylureido)crotonic acid, gamma lactone compounds* obtained according to (II) and (VIII) form salts:

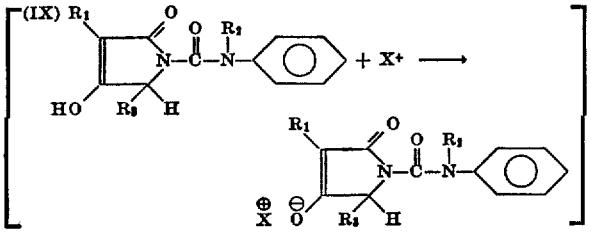

(IX)

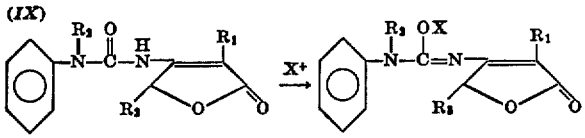

where $X^+$ represents the ions named under (I)

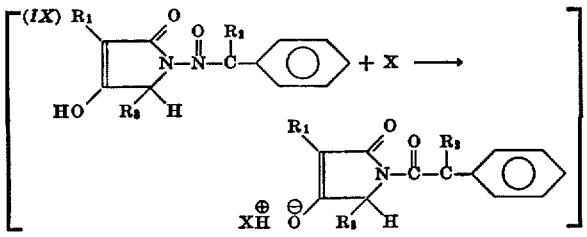

(X)

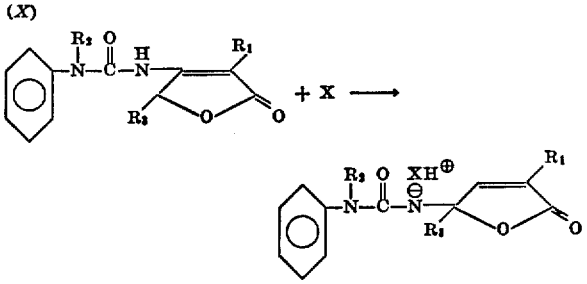

where X represents the nitrogeneous base named under (I).

The compound obtained in (II) and (VIII) is dispersed or dissolved in a suitable solvent such as an alcohol, ketone, or hydrocarbon, etc., an equimolar amount of the appropriate base such as alkali or earth alkali metal hydroxide, alkoxide, amide, or hydride, substituted or unsubstituted ammonium hydroxide, or amine is added, and the resulting mixture or solution stirred and refluxed for some time. The solvent is evaporated and the product collected.

COMPOSITIONS

The active compounds of this invention may be formulated into dilute compositions which make application to the plants easier and which permit easy penetration of the plant foliage. These compositions may be, in the case of the water soluble salts, simple aqueous solutions or they may be the defoliant compounds in combination with pesticidal carriers and/or surface active agents. Such compositions may be in the form of soluble or wettable powders, aqueous suspensions or dusts.

The surface-active agents or surfactants can include any of the anionic, cationic and non-ionic surface-active agents. A detailed list of such agents is set forth in "Detergents and Emulsifiers" 1967 Annual by John W. McCutcheon, Inc.

Among the more preferred surfactants are those anionic and non-ionic agents recognized in the art as wetting agents, dispersing agents, detergents or emulsifiers. Among the anionic surfactants, preferred ones are alkali metal or amine salts of alkylbenzenesulfonic acids such as dodecylbenzenesulfonic acid, alkali metal or amine salts of sulfated alcohols such as sodium lauryl sulfate, alkali metal or amine salts of alkynaphthalene sulfonates, sodium N-methyl-N-oleoyltaurate, oleic acid ester of sodium isethionate, dialkyl esters of sodium sulfosuccinic acid such as dioctyl sodium sulfosuccinate, and sodium dodecyldiphenyl oxide disulfonate. Among the non-ionic compounds, preferred members include alkylphenoxy poly(ethyleneoxy)ethanols such as nonylphenol adducts with ethylene oxide; trimethylnonyl polyethylene glycol ethers, polyethylene oxide adducts with fatty and rosin acids, ethylene oxide adducts with sorbitan fatty acid esters, and long chain alcohol or mercaptan adducts with ethylene oxide.

Among preferred surfactants are also dispersants such as methyl cellulose, polyvinyl alcohol, sodium lignin sulfonates, polymeric alkylnaphthalene sulfonates, and polymethylene bis sulfonates.

Surfactants can be present in compositions of this invention in the range of 0.1 to 20% by weight. However, in some instances, even greater proportions of surfactants can be used.

A class of compositions particularly suitable for water-insoluble compounds of this invention are aqueous suspension concentrates such as the ones described in U.S. Patent 3,060,084 and in U.S. Patent 3,157,486. Aqueous suspension concentrates are very desirable because of their convenience in handling and use.

Additional compositions can be formulated by adding a free-flowing inert powder to the active agents. Such compositions can then be wettable powders, water-soluble powders, or dusts.

Wettable powder compositions contain the active ingredient, one or more surfactants, and a finely divided inert diluent. The finely divided inert diluent can be any of the extenders commonly employed in the art. They can include natural clays including attapulgite or kaolinite, diatomaceous earth, pyrophyllite, talc, synthetic mineral fillers derived from silica and silicates such as synthetic fine silica and synthetic calcium or magnesium silicate, carbonates, phosphates and sulfates, sulfur, lime and flours such as wood, walnut shell, redwood, soybeans and cottonseed. Particle size of the extender can vary considerably but will ordinarily be somewhat under 50 microns in the finished formulation. The active compound ordinarily will be present in a concentration in the range of 25 to 85% by weight. Surfactants will be present in a range from 0.1 to 10% by weight to obtain adequate wetting and dispersion in water, with the remainder being largely one or more of the finely divided diluents shown above.

Wettable powders are prepared by mixing the ingredients in a blender and grinding the mixture in a hammer mill, air impact mill or the like until the particle size has been reduced to make spray application practical and easy.

Wettable powders and aqueous suspension compositions are frequently used by dilution and extension with water to form spray slurry compositions containing from 0.05% to 3% of the active ingredient.

Preferred compositions of the water soluble compounds of this invention are the water soluble powders. These may be the active compound with water soluble neutral compounds and/or surfactants, or these compositions may be the active compounds in combination with alkaline water soluble salts to increase the solubility and/or the rate of solution of the active compounds. These compositions containing basic salts can of course also contain water soluble neutral compounds. Small amounts of anticaking agents can also be present in water-soluble compositions. Such anticaking agents may also be water-soluble, but more frequently will be chosen from the finely divided inert diluents, such as are used with wettable powders. Usually the soluble powders will comprise 20 to 95% active, 0–5% anticaking agent, 0–5% surfactant and the remainder a water-soluble base and/or a water-soluble diluent. Such compositions are prepared by blending and grinding the ingredients to obtain a homogeneous pulverulent mixture. If the ingredients are already in a sufficiently fine state of subdivision to make rapid dissolution practical, mere blending will usually be sufficient.

In addition, compositions may contain additives such as corrosion inhibitors, antifoam agents and the like.

Dusts are dense powder compositions which are intended for application in dry form. They are characterized by free-flowing, rapid settling properties, so that they are not readily wind-borne to areas where their presence is not desired. Dusts contain primarily the active compound and a dense, free-flowing solid extender. It is sometimes desirable to include a wetting agent, and convenience in manufacture frequently requires inclusion of an inert absorptive grinding aid.

The dense, free-flowing solid extenders usually are those organic or inorganic powders which possess high bulk density, are free-flowing, and have relatively low surface area and liquid adsorptivity. Suitable such extenders are micaceous talcs, pyrophyllite, dense kaolin clays, ground calcium phosphate rock ("Phosphodust," American Agricultural Chemical Company), sericite, tobacco dust, etc.

The grinding aids and surface active agents can be the same as have been described for preparation of the wettable powders, above. In fact, wettable powders may be used in the preparation of dusts by dilution with the dense, free-flowing solid extender. While such wettable powders could be used directly in dust form, it is usually more advantageous to dilute them with these dense dust diluents in order to obtain more rapid settling and more uniform distribution. Similarly, the water-soluble powder composition can also be used in the preparation of dusts by dilution with the dense free-flowing solid extender.

Thus, the dust compositions of this invention will comprise about 3–30% active material, 0–30% grinding aid, 0–3% surface active agent, the remainder being the extender. These dusts are prepared by blending the ingredients and grinding to obtain homogeneous pulverulent mixtures. If the ingredients are already finely divided, thorough blending will usually suffice for the preparation of a dust.

In order that the invention may be better understood, the following examples are given.

EXAMPLE 1

Preparation of [4-hydroxy-2-oxo-3-pyrroline-1-carboxanilide] *4-hydroxy-3-(3-phenylureido)crotonic acid, gamma lactone*

One hundred and thirty six parts by weight of phenylurea and 165 parts by weight of ethyl 4-chloroacetoacetate are dispersed and dissolved in 200 parts by weight of p-dioxane. The mixture is boiled under reflux for 2 hours, cooled, and filtered. The solid is washed twice with methanol and once with diethylether. One hundred parts by weight of [4-hydroxy-2-oxo-3-pyrroline-1-carboxanilide] *4-hydroxy-3-(3-phenylureido)crotonic acid, gamma lactone* is obtained, M.P. 250° C. dec.

EXAMPLE 2

Preparation of [4-hydroxy-3-methyl-2-oxo-3-pyrroline-1-carboxanilide] *2 - methyl-4-hydroxy-3-(phenylureido) crotonic acid, gamma lactone*

Thirty four parts by weight of phenylurea and 56 parts by weight of ethyl 4-bromo-2-methylacetoacetate are dispersed and dissolved respectively in 100 ml. of p-dioxane. The mixture is boiled under reflux for four hours, cooled, and filtered. The solid is washed twice with methanol and once with ether to yield 7 parts by weight [4-hydroxy-3-methyl-2-oxo-3-pyrroline-1-carboxanilide], *2-methyl-4-hydroxy-3-(3-phenylureido)crotonic acid, gamma lactone,* M.P. 277° C. dec.

EXAMPLE 3

Preparation of [4-hydroxy-N-methyl-2-oxo-3-pyrroline-1-carboxanilide] *4-hydroxy-3-(3-methyl-3-phenylureido) crotonic acid, gamma lactone*

Thirty parts by weight of 1-methyl-1-phenylurea and 41.8 parts by weight of ethyl 4-bromoacetoacetate are dissolved in 200 parts by weight of tetrahydrofuran, and the solution is boiled under reflux for three hours. The solvent is evaporated in vacuo and the residue redissolved in methylene chloride. This solution is extracted with aqueous sodium hydroxide solution and the latter subsequently acidified with hydrochloric acid. The precipitate is filtered, washed with water, and recrystallized from an ethanol-water mixture to yield 6 parts by weight of [4 - hydroxy-N-methyl-2-oxo-3-pyrroline-1-carboxanilide] *4-hydroxy-3-methyl-3-phenylureido)crotonic acid, gamma lactone,* M.P. 197–198° C.

The following compounds are prepared in the same manner as described in Examples 1, 2 and 3 starting with the appropriately substituted 4-bromo- or chloroacetoactic acid esters and ureas:

[4-hydroxy-2-oxo-5-propyl-3-pyrroline-1-carboxanilide
3-ethyl-4-hydroxy-2-oxo-3-pyrroline-1-carboxanilide
5-ethyl-4-hydroxy-2-oxo-3-pyrroline-1-carboxanilide
3,5-dimethyl-4-hydroxy-2-oxo-3-pyrroline-1-carboxanilide
3-fluoro-4-hydroxy-2-oxo-3-pyrroline-1-carboxanilide
4-hydroxy-2-oxo-N-propyl-3-pyrroline-1-carboxanilide
4-hydroxy-2-oxo-3-pyrroline-1-(N-ethylcarboxanilide)
3-methyl-4-hydroxy-2-oxo-3-pyrroline-1-(N-methylcarboxanilide).]

*4-hydroxy-4-propyl-3-(3-phenylureido)crotonic acid, gamma lactone*
*2-ethyl-4-hydroxy-3-(3-phenylureido)crotonic acid, gamma lactone*
*4-ethyl-4-hydroxy-3-(3-phenylureido)crotonic acid, gamma lactone*
*2,4-dimethyl-4-hydroxy-3-(phenylureido)crotonic acid, gamma lactone*
*2-fluoro-4-hydroxy-3-(3-phenylureido)crotonic acid, gamma lactone*
*4-hydroxy-3-(3-propyl-3-phenylureido)crotonic acid, gamma lactone*
*4-hydroxy-3-(3-ethyl-3-phenylureido)crotonic acid, gamma lactone*
*2-methyl-4-hydroxy-3-(3-methyl-3-phenylureido)crotonic acid, gamma lactone*

EXAMPLE 4

Preparation of [3-chloro-4-hydroxy-2-oxo-3-pyrroline-1-carboxanilide] *2-chloro-4-hydroxy-3-(3-phenylureido) crotonic acid, gamma lactone*

Twenty parts by weight of [4-hydroxy-2-oxo-3-pyrroline-1-carboxanilide] *4-hydroxy-3-(3 - phenylureido)crotonic acid, gamma lactone* is suspended in 200 parts by weight of glacial acetic acid. 12.2 parts by weight of sulfuryl chloride in 200 parts by weight of glacial acetic acid is added dropwise at room temperature with mechanical stirring. The mixture is stirred at room temperature for half an hour, filtered, the solid washed with water, and recrystallized from a dimethylformamide-water mixture to yield 13 parts by weight of [3-chloro-4-hydroxy-2-oxo-3-pyrroline - 1 - carboxanilide] *2-chloro-4-hydroxy-3-(3-phenylureido)crotonic acid, gamma lactone,* M.P. 268° C. dec.

EXAMPLE 5

Preparation of [3-bromo-4-hydroxy-2-oxo-3-pyrroline-1-N-methylcarboxanilide] *2-bromo-4-hydroxy-3-(3-methyl-3-phenylureido)crotonic acid, gamma lactone*

Two parts by weight of [4-hydroxy-N-methyl-2-oxo-3-pyrroline - 1 - carboxanilide] *4-hydroxy-3-(3-methyl-3-*

*phenylureido)crotonic acid, gamma lactone* is suspended in 25 parts by weight of glacial acetic acid. 1.4 parts by weight of bromine in 10 parts by weight of glacial acetic acid is added dropwise at room temperature under stirring. The mixture is stirred at room temperature for one hour. About 50 parts by weight of water is added slowly, and the mixture is filtered. The solid is washed thoroughly with water and methanol. Two parts by weight of [3-bromo-4-hydroxy-2-oxo-3-pyrroline-1-(N - methylcarboxanilide)] *2-bromo-4-hydroxy-3-(3-methyl-3-phenylureido)crotonic acid, gamma lactone* is obtained, M.P. 198° C. dec.

The following compounds are prepared as described in Examples 4 and 5, starting with the appropriately substituted [4 - hydroxy-2-oxo-3-pyrroline-1-carboxanilide.] *4-hydroxy-3-(3-phenylureido)crotonic acid, gamma lactone.*

[3-bromo-4-hydroxy-2-oxo-5-propyl-3-pyrroline-1-carboxanilide
3-iodo-4-hydroxy-2-oxo-3-pyrroline-1-carboxanilide
3-bromo-4-hydroxy-2-oxo-3-pyrroline-1-carboxanilide
3-bromo-4-hydroxy-N-isopropyl-2-oxo-3-pyrroline-1-carboxanilide
3-chloro-4-hydroxy-N-methyl-2-oxo-3-pyrroline-1-carboxanilide
3-chloro-4-hydroxy-5-methyl-2-oxo-3-pyrroline-1-carboxanilide
3-bromo-4-hydroxy-2-oxo-3-pyrroline-1-(N-ethylcarboxanilide)]
*2-bromo-4-hydroxy-4-propyl-3-(3-phenylureido)crotonic acid, gamma lactone*
*2-iodo-4-hydroxy-3-(3-phenylureido)crotonic acid, gamma lactone*
*2-bromo-4-hydroxy-3-(3-phenylureido)crotonic acid, gamma lactone*
*2-bromo-4-hydroxy-3-(3-isopropyl-3-phenylureido) crotonic acid, gamma lactone*
*2-chloro-4-hydroxy-3-(3-methyl-3-phenylureido)crotonic acid, gamma lactone*
*2-chloro-4-hydroxy-4-methyl-3-(3-phenylureido)crotonic acid, gamma lactone*
*2-bromo-4-hydroxy-3-(3-ethyl-3-phenylureido)crotonic acid, gamma lactone*

EXAMPLE 6

Preparation of the potassium salt of [4-hydroxy-2-oxo-3-pyrroline-1-carboxanilide] *4 - hydroxy-3-(3-phenylureido)crotonic acid, gamma lactone*

Ten parts by weight of [4-hydroxy-2-oxo-3-pyrroline-1-carboxanilide] *4-hydroxy-3-(3-phenylureido)crotonic acid, gamma lactone* and 3 parts by weight of 87.3% potassium hydroxide pellets are dispersed in 100 parts by weight of methanol. The mixture is boiled under reflux until a clear solution results. The solution is cooled and the methanol evaporated in vacuo. Benzene is added and evaporated in vacuo. The residue is collected and finely pulverized. Eleven parts by weight of the above potassium salt is obtained, M.P. 165° C. dec.

EXAMPLE 7

Preparation of the sodium salt of [3-bromo-4-hydroxy-2-oxo-3-pyrroline-1-carboxanilide] *2-bromo-4-hydroxy-3-(3-phenylureido)crotonic acid, gamma lactone*

2.5 parts by weight of [3-bromo-4-hydroxy-2-oxo-3-pyrroline-1-carboxanilide] *2-bromo-4-hydroxy-3-(3-phenylureido)crotonic acid, gamma lactone* is suspended in 100 parts by weight of methanol. 1.5 parts by weight of sodium methoxide is added and the mixture is stirred. A clear solution results after about half an hour. The solvent is stripped in vacuo, and the solid residue collected and finely pulverized. Nine parts by weight of the above sodium salt is obtained, M.P. 190° C. dec.

The following compounds are prepared as described in Examples 6 and 7, starting with the appropriately substituted [4 - hydroxy-2-oxo-3-pyrroline-1-carboxanilides] *4-hydroxy-3-(3-phenylureido)crotonic acid, gamma lactone compounds* and the appropriate base.

[4-hydroxy-2-oxo-3-pyrroline-1-carboxanilide, sodium, potassium, and lithium salts
4-hydroxy-2-oxo-3-pyrroline-1-carboxanilide, magnesium, calcium, barium salts
3-chloro-4-hydroxy-2-oxo-3-pyrroline-1-carboxanilide, sodium, potassium, lithium salts
3-bromo-4-hydroxy-2-oxo-3-pyrroline-1-carboxanilide, magnesium, calcium, barium salts
4-hydroxy-2-oxo-3-pyrroline-1-(N-methylcarboxanilide), ammonium salt
4-hydroxy-2-oxo-3-pyrroline-1-(N-ethylcarboxanilide), tetramethyl ammonium salt
4-hydroxy-2-oxo-3-pyrroline-1-(N-isopropylcarboxanilide), benzylamine salt
4-hydroxy-5-ethyl-2-oxo-3-pyrroline-1-carboxanilide, dipropylamine salt
4-hydroxy-5-ethyl-2-oxo-3-pyrroline-1-carboxanilide, tert-butylamine salt
3-fluoro-4-hydroxy-2-oxo-3-pyrroline-1-carboxanilide, sodium salt
4-hydroxy-3-methyl-2-oxo-3-pyrroline-1-carboxanilide, calcium salt
3-chloro-4-hydroxy-2-oxo-3-pyrroline-1-(N-methylcarboxanilide), potassium salt
3-bromo-4-hydroxy-2-oxo-3-pyrroline-1-(N-propylcarboxanilide), sodium salt]
*4-hydroxy-3-(3-phenylureido)crotonic acid, gamma lactone, sodium, potassium, and lithium salts*
*4-hydroxy-3-(3-phenylureido)crotonic acid, gamma lactone, magnesium, calcium, barium salts*
*2-chloro-4-hydroxy-3-(3-phenylureido)crotonic acid, gamma lactone, sodium, potassium, lithium salts*
*2-bromo-4-hydroxy-3-(3-phenylureido)crotonic acid, gamma lactone, magnesium, calcium, barium salts*
*4-hydroxy-3-(3-methyl-3-phenylureido)crotonic acid, gamma lactone, ammonium salt*
*4-hydroxy-3-(3-ethyl-3-phenylureido)crotonic acid, gamma lactone, tetramethyl ammonium salt*
*4-hydroxy-3-(3-isopropyl-3-phenylureido)crotonic acid, gamma lactone, benzylamine salt*
*4-hydroxy-4-methyl-3-(phenylureido)crotonic acid, gamma lactone, dipropylamine salt*
*4-ethyl-4-hydroxy-3-(3-phenylureido)crotonic acid, gamma lactone, tert-butylamine salt*
*2-fluoro-4-hydroxy-3-(3-phenylureido)crotonic acid, gamma lactone, sodium salt*
*2-methyl-4-hydroxy-3-(3-phenylureido)crotonic acid, gamma lactone, calcium salt*
*2-chloro-4-hydroxy-3-(3-methyl-3-phenylureido)crotonic acid, gamma lactone, potassium salt*
*2-bromo-4-hydroxy-3-(3-propyl-3-phenylureido)crotonic acid, gamma lactone, sodium salt*

EXAMPLE 8

Preparation of [4-ethoxy-2-oxo-3-pyrroline - 1 - carboxanilide] *4-hydroxy-3-(1-ethyl-3-phenylureido)crotonic acid, gamma lactone*

Ten and nine-tenths parts by weight of [4-hydroxy-2-oxo-3-pyrroline-1-carboxanilide] *4-hydroxy-3-(3-phenylureido)crotonic acid, gamma lactone* are suspended in 140 parts by weight of methylene chloride. Nine and five-tenths parts by weight of triethyloxonium fluoroborate is added, and the mixture stirred at room temperature overnight. A clear solution results. Aqueous sodium bicarbonate solution is added and the two-phase system stirred at room temperature for one hour. A precipitate appears which is filtered off and recrystallized from ethanol.

With the appropriate Meerwein reagent, the following analogs may be synthesized:

[4-methoxy-2-oxo-3-pyrroline-1-carboxanilide
4-isopropoxy-2-oxo-3-pyrroline-1-carboxanilide 4-butoxy-2-oxo-3-pyrroline-1-carboxanilide
3-bromo-4-methoxy-2-oxo-3-pyrroline-1-carboxanilide
3-chloro-4-methoxy-2-oxo-3-pyrroline-1-carboxanilide
3-bromo-4-ethoxy-2-oxo-3-pyrroline-1-carboxanilide]
*4-hydroxy-3-(1-methyl-3-phenylureido)crotonic acid, gamma lactone*
*4-hydroxy-3-(1-isopropyl-3-phenylureido) crotonic acid, gamma lactone*
*4-hydroxy-3-(1-butyl-3-phenylureido)crotonic acid, gamma lactone*
*2-bromo-4-hydroxy-3-(1-methyl-3-phenylureido)crotonic acid, gamma lactone*
*2-chloro-4-hydroxy-3-(1-methyl-3-phenylureido)crotonic acid, gamma lactone*
*2-bromo-4-hydroxy-3-(1-ethyl-3-phenylureido)crotonic acid, gamma lactone*

EXAMPLE 9

A water soluble powder formulation

| | Percent |
|---|---|
| [4 - hydroxy - 2 - oxo - 3 - pyrroline - 1 - carboxanilide] *4-hydroxy-3-(3-phenylureido)crotonic acid, gamma lactone, sodium salt* | 80.0 |
| Dioctyl ester of sodium sulfosuccinic acid | 2.5 |
| Methyl cellulose | 0.5 |
| Trisodium phosphate dodecahydrate | 17.0 |

The ingredients are combined in a ribbon blender and ground in a hammer mill to insure intimate mixing.

An 0.4% aqueous solution of the above composition is applied to mature cotton at the rate of one kilogram of the sodium salt of [4-hydroxy-2-oxo-3-pyrroline-1-carboxanilide] *4-hydroxy - 3 - (3-phenylureido)crotonic acid, gamma lactone per hectare.* The application is made utilizing ground equipment. As a result of this treatment abscission of the cotton leaves is obtained within one week after application of the chemical, thereby allowing all of the cotton bolls, from the lower portions of the plants to their tops, to mature uniformly and facilitating subsequent mechanical harvesting. Subsequent regrowth is retarded. The cotton produces a good yield of stainfree, high-quality lint.

An aqueous solution containing 3 kilograms of the sodium salt of [4-hydroxy-2-oxo-3-pyrroline-1-carboxanilide] *4-hydroxy-3-(3-phenylureido)crotonic acid, gamma lactone* in 400 l. of water is prepared and sprayed uniformly over a hectare of bluegrass turf after the second morning in the spring. The treatment retards the growth of the grass through the spring and markedly reduces the number of mowings necessary to maintain the neat appearance of the turf compared to similar untreated areas.

EXAMPLE 10

A water soluble powder formulation

| | Percent |
|---|---|
| [4 - hydroxy - 2 - oxo - 3 - pyrroline - 1 - carboxanilide] *4-hydroxy-3-(3-phenylureido)crotonic acid, gamma lactone* | 95.0 |
| Sodium alkyl naphthalene sulfonate | 2.0 |
| Sodium salt of a partially desulfonated lignin sulfonate | 2.0 |
| Synthetic fine silica | 3.0 |

The formulation is prepared by the intimate blending of the small crystals of [4-hydroxy-2-oxo-3-pyrroline-1-carboxanilide] *4-hydroxy - 3 - (3-phenylureido)crotonic acid, gamma lactone,* lithium salt with the other ingredients in a ribbon blender or similar device.

The above composition is dissolved in water to a concentration of 7.2%. The so obtained solution is applied by airplane to a field of soybeans at a treatment rate of 3 kilograms of the lithium salt per hectare. The treatment causes abscission of the leaves which, in turn, promotes more uniform ripening of the beans regardless of their position on the plants. The subsequently harvested crop is of higher quality than soybeans harvested from a neighboring untreated field.

EXAMPLE 11

A wettable powder formulation

| | Percent |
|---|---|
| [3 - chloro - 4 - hydroxy - 2 - oxo - 3 - pyrroline - 1-carboxanilide] *2 - chloro-4-hydroxy-3-(3-phenylureido)crotonic acid, gamma lactone* | 50.0 |
| Sodium lauryl sulfate | 0.5 |
| Calcium lignin sulfonate | 2.0 |
| Kaolin clay | 47.5 |

The ingredients are combined in a ribbon blender and ground in a hammer mill until the particle size is essentially less than 50 microns in diameter.

The composition described above is dispersed in water to a concentration of 0.15%, based on the weight of [3 - chloro - 4 - hydroxy - 2 - oxo - 3 - pyrroline - 1-carboxanilide] *2-chloro - 4 - hydroxy-3-(3-phenylureido) crotonic acid, gamma lactone.* To this suspension is added the S,S,S-tributyl ester of phosphorotrithious acid in the form of an emulsifiable concentrate (commercially available under the trademark "Folex") in an amount sufficient to raise the total content of active ingredients in the suspension to 0.3%. The accordingly prepared suspension is applied by ground sprayer to a field of cotton which is approaching maturity. The rate of application is 0.5 kg./hectare of each of the two active ingredients. The treatment results in substantially complete defoliation and/or desiccation of the leaves of the cotton plants. The development of new leaves is retarded. No difficulties are encountered in harvesting the treated field by machine. The harvested bolls contain significantly less trash than those from an untreated control strip.

EXAMPLE 12

An aqueous suspension formulation

| | Percent |
|---|---|
| [3 - bromo - 4 - hydroxy - 2 - oxo - 3 - pyrrolidine-1-carboxanilide] *2-bromo-4-hydroxy-3-(3-phenylureido)crotonic acid, gamma lactone* | 40.0 |
| Sodium alkyl naphthalene sulfonate | 0.5 |
| Calcium lignin sulfonate | 9.0 |
| Hydrated attapulgite clay | 1.8 |
| Water | 48.7 |

All of the ingredients are blended together and ground in a sand mill until the particles are essentially less than 10 microns in diameter.

This composition is suspended in water to give an aqueous dispersion containing 0.2% of the substituted [pyrroline-carboxanilide] *4-hydroxy-3-(3-phenylureido) crotonic acid, gamma lactone* compound. The spray composition is applied to a maturing field of tomato plants, utilizing 0.65 kg./hectare of active ingredient, and causes most of the leaves to drop within eight days after treatment. The fruit of the defoliated plants ripens more easily and is less subject to disease than the fruit from control plots.

EXAMPLE 13

A water soluble salt formulation

| | Percent |
|---|---|
| [4 - hydroxy - 2 - oxo - 3 - pyrroline- 1 - carboxanilide] *4-hydroxy-3-(3-phenylureido)crotonic acid, gamma lactone,* sodium salt | 50.0 |
| Dioctylester of sodium sulfosuccinate | 0.5 |
| Sodium salts of polymerized alkyl naphthalene sulfonic acids | 1.0 |
| Tri-sodium phosphate | 48.5 |

The formulation is prepared by blending the ingredients in a ribbon blender or similar device and grinding the mixture in a hammer mill to insure intimate mixing.

The above composition is extended with water to a concentration of 0.35% of the sodium salt. A volume of 250 liters of this freshly prepared solution is uniformly applied to a maturing field of seed alfalfa causing abcissions of most of the leaves. The absence of succulent foliage permits direct combining of seed from the treated field.

Eight kilograms of this composition are dissolved in 500 l. of water and applied to runoff on a freshly trimmed and growing mixed brush stand under a power line. The treatment retards the growth of the brush and lengthens the interval before another trimming is necessary.

EXAMPLE 14

A water soluble salt formulation

| | Percent |
|---|---|
| [4 - hydroxy - 2 - oxo - 3 - pyrroline - 1 - carboxanilide] *4-hydroxy - 3 - (3-phenylureido)crotonic acid, gamma lactone,* lithium salt | 50.0 |
| Sodium lauryl sulfate | 0.5 |
| Sodium meta-silicate, anhydrous | 23.5 |
| Potassium carbonate | 26.0 |

The formulation is prepared by blending the ingredients and grinding in a hammer mill to insure intimate mixing.

The above composition is extended with water to give an ultimate concentration of 1.2% of the lithium salt of the substituted pyrrolidine carboxanilide compound. This liquid spray composition is applied in a volume of 300 l./hectare to a field of cotton which is at the stage of development where the first bolls are open. After six to eight days most of the leaves fall to the ground while still green. The field matures much more uniformly than an adjacent untreated field and is readily harvested by mechanical means.

EXAMPLE 15

A dust formulation

| | Percent |
|---|---|
| [3 - chloro - 4 - hydroxy - 2 - oxo - 3 - pyrrolidine-1-carboxanilide] *2-chloro-4-hydroxy-3-(3-phenylureido) crotonic acid, gamma lactone* | 10 |
| Calcium silicate | 10 |
| Calcium carbonate coated with calcium stearate | 80 |

The active ingredient and the calcium silicate are blended together and ground in a hammer mill. This intimate mix is then charged to a ribbon blender along with the coated calcium carbonate. The mixture is thoroughly blended to insure uniform distribution of the active ingredient throughout the dust.

The above dust composition is applied to a maturing cotton field in the early morning when the plants are wet from dew at the rate of 30 kg./hectare and causes almost complete defoliation of the crop plants. The defoliated area is harvested by machine and yields a highly satisfactory crop of stainfree and trashfree lint.

EXAMPLE 16

A wettable powder formulation

| | Percent |
|---|---|
| [4-ethoxy - 2 - oxo-3-pyrroline-1-carboxanilide] *4-hydroxy - 3 - (1 - ethyl-3-phenylureido)crotonic acid, gamma lactone* | 30 |
| Sodium alkylnaphthalenesulfonate | 2 |
| Sodium lignin sulfonate | 2 |
| Attapulgite | 66 |

The ingredients are blended, passed through an air mill until the average particle size is 15 microns, reblended, sifted through a USS #50 sieve (0.3 mm. opening), and packaged.

This formulation is applied to mature cotton approximately ten days before harvest at the rate of 2 kg./ha. (active ingredient) suspended in 250 liters of water. The treatment provides good defoliation of the cotton, and facilitates mechanical harvesting of the cotton fibers.

EXAMPLE 17

A wettable powder formulation

| | Percent |
|---|---|
| [3-bromo-4-hydroxy - 2 - oxo-3-pyrroline-1-carboxanilide] *2 - bromo-4-hydroxy-3-(3-phenylureido) crotonic acid, gamma lactone* | 70.0 |
| Sodium alkyl naphthalene sulfonate | 2.0 |
| Sodium salt of partially disulfonated lignin sulfonate | 3.0 |
| Attapulgite clay | 25.0 |

All of the ingredients are blended together in a ribbon blender or similar device. Following this the mixture is ground in a hammer mill until the particle size is substantially less than 50 microns in diameter.

The above-described composition is dispersed in water and applied by air to a maturing field of cotton at a rate of 10 kg. of [pyrroline carboxanilide] *2-bromo-4-hydroxy-3-(3-phenylureido) crotonic acid, gamma lactone* compound per hectare. The spray volume is 45 liters per hectare. Soon after treatment the sprayed plants shed most of their leaves thereby permitting the bolls to mature. At full maturity [of] the crop is harvested by machine, yielding a large volume of high-quality lint.

All of the compounds of this invention can be formulated and applied in the same manner as Example 17, with similar results.

UTILITY

The compounds of the present invention at rates of 0.25 to 30 kg. per hectare are useful for the defoliation of a large variety of plants, thereby aiding maturation and/or facilitating the harvesting operation. Among the crops which benefit from the application of the harvest aids in accordance with the invention are cotton, legume and grass seed crops, soybeans, kidney beans and other beans, tomatoes, etc. These compounds are also useful for the retardation of the growth of grasses and brush. On many species including Kentucky bluegrass, prinet and forsythia they cause retardation of growth with little plant injury. On other species, such as orchard grass and black willow they cause injury in addition to retardation. By selection of the proper species, rate and time of application, these compounds may be used to retard the growth of plants and, thereby, reduce the labor required to maintain them at a desirable size. This retardant effect is also useful in the prevention of regrowth of defoliated plants. The compounds of the invention may be applied in liquid or dry compositions either by themselves or mixed with other harvest aids which are commonly known in the art, such as the S,S,S-tributyl ester of phosphorotrithious acid, pentachlorophenol, sodium or magnesium chlorate, calcium cyanamid, ammonium nitrate, arsenic acids and others.

What is claimed is:

1. A compound of the formula

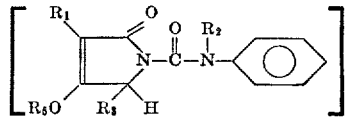

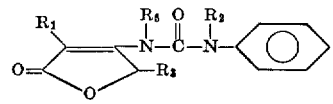

where:

$R_1$ is hydrogen, halogen, methyl or ethyl;

$R_2$ and $R_3$ are each independently selected from hydrogen or alkyl of one through three carbon atoms;

$R_5$ is hydrogen or alkyl of one through four carbon atoms; and salts of said compounds when $R_5$ is hydrogen with an alkali metal ion, alkaline earth metal ion, ammonium ion or an ion having the structure $H_y(R_4)_{4-y}N^+$ where $R_4$ is an alkyl radical of one through four carbon atoms or benzyl and $y$ is 0 to 3.

2. A compound as in claim 1 where $R_1$ is hydrogen or chlorine, $R_2$ is methyl, $R_3$ is hydrogen and salts of said compound with lithium ions, sodium ions and potassium ions.

3. A compound as in claim 1 having the formula [4-hydroxy-2-oxo-3-pyrroline-1-carboxanilide] *4-hydroxy-3-(3-phenylureido)crotonic acid, gamma lactone.*

4. The sodium salt of the compound of claim 3.

5. The lithium salt of the compound of claim 3.

6. A compound as in claim 1 having the formula [3-chloro - 4 - hydroxy-2-oxo-3-pyrroline-1-carboxanilide] *2-chloro - 4 - hydroxy - 3 - (3-phenylureido)crotonic acid, gamma lactone.*

7. The sodium salt of the compound of claim 6.

8. The potassium salt of the compound of claim 6.

References Cited

The following references, cited by the Examiner, are of record in the patented file of this patent or the original patent.

UNITED STATES PATENTS 3,576,010 4/1971 Bachman --------- 260—343.6

OTHER REFERENCES

Wiley: Chem. Abs., vol. 44: 1062e (1950).

ALEX MAZEL, Primary Examiner

A. M. T. TIGHE, Assistant Examiner

U.S. Cl. X.R.

71—69, 75, 76, 88